United States Patent
Dideriksen et al.

(10) Patent No.: US 7,441,020 B2
(45) Date of Patent: Oct. 21, 2008

(54) MEDIA PLUG-IN REGISTRATION AND DYNAMIC LOADING

(75) Inventors: Tedd Dideriksen, Woodinville, WA (US); James M. Alkove, Woodinville, WA (US); Patrick N. Nelson, Seattle, WA (US); Richard William Saunders, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 10/609,107

(22) Filed: Jun. 27, 2003

(65) Prior Publication Data

US 2004/0267940 A1  Dec. 30, 2004

(51) Int. Cl.
*G06F 15/16* (2006.01)
*H04L 9/32* (2006.01)

(52) U.S. Cl. .................................... 709/221; 726/26
(58) Field of Classification Search ............ 709/228, 709/220, 221; 726/26
See application file for complete search history.

(56) References Cited

U.S. PATENT DOCUMENTS

| 5,913,038 | A | 6/1999 | Griffiths |
| 6,209,041 | B1 | 3/2001 | Shaw et al. |
| 6,298,370 | B1 * | 10/2001 | Tang et al. .................. 718/102 |
| 6,983,464 | B1 * | 1/2006 | Bhattacharya et al. ...... 719/318 |

* cited by examiner

*Primary Examiner*—Andrew Caldwell
*Assistant Examiner*—Bradford F Fritz
(74) *Attorney, Agent, or Firm*—Lee & Hayes, PLLC

(57) ABSTRACT

Systems and methods are described for registering a plug-in with a media player and for dynamically loading the plug-in into the media player. When a plug-in is installed for use in the media player, it calls a registration function of the media player. The registration function specifies registration parameters to be provided by the plug-in. The registration function receives the registration parameters passed from the plug-in and stores them in a registry of the operating system in a specified format in the registry that enables the media player to recognize and load the plug-in if called to do so. The media player dynamically loads plug-ins in a manner that provides a seamless media presentation experience for a user.

29 Claims, 9 Drawing Sheets

MEDIA PLUG-IN REGISTRATION AND DYNAMIC LOADING

TECHNICAL FIELD

The present disclosure generally relates to streaming media, and more particularly, to registering a media plug-in with a media player and dynamically loading a media plug-in in a media player.

BACKGROUND

Multimedia content streaming, such as the streaming of audio, video, and/or text media content is becoming increasingly popular. The term "streaming" is typically used to indicate that the data representing the media is provided over a network to a client computer and the client computer renders the streaming content as it is received from a network server, rather than waiting for an entire content "file" to be delivered.

The popularity of multimedia presentations has driven the development of various multimedia data formats and the development of multimedia players needed for playing the various data formats. Multimedia players executing on client computers typically process multimedia data through a series of steps that include reading a data file, parsing the data into separate data streams (e.g., a video stream and audio stream), decoding each data stream, and rendering the data streams for presentation (e.g., on a video display or audio speaker). Each of the steps is performed by a software component called a "filter".

One method used for processing the increasing number of multimedia data formats is to combine different filters into a filter graph that includes a chain or chains of filters. For example, once the data format of a desired data stream is determined, a graph can be constructed by selecting a set of filters that is appropriate for processing the data stream. The filters selected for the filter graph would each be compatible with the media type of the data stream and would generally include a file reader for reading multimedia data from a source, a demultiplexer or parser for separating multiplexed data, a decoder for decoding encoded data, and a renderer to display or "sound" the data. Each of these filters would then be combined within the architecture of a filter graph to efficiently process the multimedia data.

Currently available multimedia players, such as Windows Media Player developed by Microsoft Corporation of Redmond, Wash., permit third party vendors to develop software plug-ins (i.e., filters) for installation in the players that modify or process audio and video data before it is rendered by the players. Plug-ins that modify/process data that is in a format already known to the media player are often called DSP (digital signal processing) plug-ins or transform plug-ins. Thus, a user can purchase and download an audio or video plug-in from a Web site and install and configure the plug-in in a media player to create a desired effect when listening to music or watching a video. Examples of audio effects that might be created by an audio plug-in may include a surround-sound effect, an intensification of a particular frequency range such as causing a larger base response, an echo effect, and so on.

Another type of plug-in that is available for certain media players is called a rendering plug-in. Rendering plug-ins can be installed in a media player to allow the media player to render new media types (e.g., custom audio, video, animation) whose formats are not natively known to the media player. Thus, a third party vendor can create a rendering plug-in to enable their own custom media data type to be streamed from a content server and played in a player via their plug-in. An example of a new media type that may not be natively supported by a media player might be streaming stock ticker data in a text format. A vendor could develop a rendering plug-in to be installed and loaded into a media player that enables the streaming stock ticker data to appear in one area of a video display, while other video data being processed by the player appears in the rest of the video display.

Although such plug-ins can provide versatility in the types and processing options of multimedia for some media players, they have various disadvantages in the way they are currently used in media players. One disadvantage with the way media players use plug-ins is that they require a user to interrupt media presentations before the plug-ins can be enabled (i.e., available for use). The reason, in general, is that a filter graph constructed for a currently running media presentation must be torn apart and reconstructed with a newly installed plug-in filter before the plug-in can be used. This deconstruction and reconstruction requires that a user stop the current media presentation, selectively load the newly installed plug-in, restart the media presentation from the beginning, and attempt to find the location in the media presentation where the playback was interrupted. As an example, a user may come across a desirable plug-in while surfing the Internet and watching a favorite music video through a media player. Typically, the user could purchase the plug-in, download it, and install it on the computer in a matter of moments. However, in order to load the plug-in into the media player and use it, the media player must be stopped and the media experience interrupted. After loading the plug-in, the media must be restarted. If the user wants to find the location where the player left off playing the media, the user must search through the media "manually".

Another disadvantage with the way media players use plug-ins is that they do not require that the plug-ins be exclusively registered with the player. This creates problems for third party vendors who develop and sell plug-ins for use in specific media players. Without an exclusive registration, plug-ins sold to users with the intent that the plug-ins be used on a particular type of media player can easily be pirated for use on other types of media players.

Accordingly, a need exists for ways to overcome current problems with registering and loading media player plug-ins.

SUMMARY

Registration and dynamic loading of media player plug-ins is described herein.

In accordance with one implementation, a media player receives a call to register a plug-in. The media player receives a specified set of registration parameters from the plug-in and stores the parameters in a registry of the operating system in a specific format.

In accordance with another implementation, a plug-in (i.e., filter) is dynamically loaded into a media player filter graph during the processing of a data stream. The plug-in is recognized based on a set of registration parameters previously stored in a registry by a registration function.

BRIEF DESCRIPTION OF THE DRAWINGS

The same reference numerals are used throughout the drawings to reference like components and features.

FIG. 4 illustrates an example of a filter graph used to demonstrate dynamic and automatic loading of a newly installed plug-in.

DETAILED DESCRIPTION

Overview

The following discussion is directed to systems and methods for registering a plug-in with a media player and for dynamically loading the plug-in into the media player. As used throughout this disclosure, the terms "plug-in" and "filter" are, in general, used interchangeably. When a plug-in is installed in the media player, it calls a registration function of the media player. The registration function specifies registration parameters to be provided by the plug-in. The registration function receives the registration parameters passed from the plug-in and stores them in a registry of the operating system. The registration parameters are stored in a specified format in the registry which enables the media player to recognize and load the plug-in if called to do so based on an automatic invocation specified during registration or based on a user input instruction.

A media player dynamically loads plug-ins in a manner that provides a seamless media presentation experience for a user. The player constructs an initial filter graph to process and render a data stream from a source file. Upon receiving an instruction to insert a plug-in, the processing of the data stream is stopped so the filter graph can be manipulated. The player reads the registry settings to determine what plug-ins are enabled and their priority in the filter graph (i.e., where they should be inserted into the filter graph). The player deconstructs the filter graph, inserts the plug-in at its appropriate priority location, and then reconnects the graph. The media player then automatically begins playback at the same location in the data stream where it was stopped. The player implements this dynamic loading of the plug-in automatically without requiring user input to stop the media, restart the media, or locate the position in the media where the playback was stopped. In addition, the dynamic loading happens virtually instantaneously maintaining a seamless media presentation experience for a user.

Exemplary Environment

Figure 1:
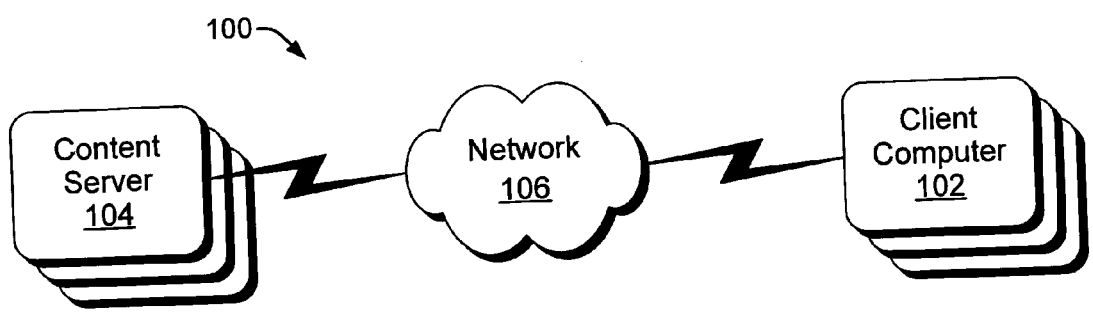
FIG. 1 illustrates an exemplary network environment suitable for registering and dynamically loading media plug-ins.

FIG. 1 illustrates an exemplary network environment 100 suitable for registering and dynamically loading media plug-ins. In the exemplary network environment 100, multiple client computing devices 102 are coupled to multiple content server computing devices 104 via a network 106. Network 106 is intended to represent any of a variety of conventional network topologies and types (including optical, wired and/or wireless networks), employing any of a variety of conventional network protocols (including public and/or proprietary protocols). Network 106 may include, for example, the Internet as well as possibly at least portions of one or more local area networks (LANs) and/or wide area networks (WANS).

Requests from a client computer 102 for media content that is available on a content server device 104 are routed from the client computer 102 to the content server 104 via network 106. The content server 104 receives the request and returns the requested content to the requesting client computer 102 via network 106. One or more proxy servers (not shown) may be part of network 106, and requests from client computer 102 and responses to client computer 102 may be sent to and received from such a proxy server(s) rather than the actual content server device 104. Whatever type of device (whether it be a content server, proxy server, or other device) is delivering the media content to a client computer 102 may be referred to as the source device for that media content.

Client computing devices 102 and content server computing devices 104 can each be any of a variety of conventional computing devices, including desktop PCs, notebook or portable computers, workstations, mainframe computers, Internet appliances, gaming consoles, handheld PCs, cellular telephones or other wireless communications devices, personal digital assistants (PDAs), combinations thereof, and so on. One or more of devices 102 and 104 can be the same types of devices, or alternatively different types of devices. An exemplary computing environment for implementing a client computing device 102 and a content server computing device 104 is described in more detail herein below with reference to FIG. 11.

Content server devices 104 are typically implemented as a standard Web server or a streaming media server configured to deliver media content to a client computer 102. However, client computer 102 can also access media content from local media sources such as a local hard drive or other memory storage device (e.g., a DVD, a CD, a memory card, etc.) that is local to the client computer 102. The media content accessed by a client computer may be any of a variety of one or more types of media data, such as audio, video, text, images, animation, and so on. Coming from a content server 104, media data may be publicly available or alternatively restricted (e.g., restricted to only certain users, available only if the appropriate fee is paid, etc.). Additionally, the data may be "on-demand" (e.g., pre-recorded and of a known size) or alternatively "broadcast" (e.g., having no known size, such as a digital representation of a concert being captured as the concert is performed and made available for streaming shortly after capture).

As indicated above, content server 104 can be a Web server that delivers media content to client computer 102. One way for a Web server to provide media content to client computer 102 is as a downloaded media file. Such a media file therefore becomes a local file on client computer 102 prior to being played back on the client. A Web server can also provide media content to a client computer 102 as a progressively downloaded media file. In the case of a progressive download, the client 102 begins playing back the media file before the entire file is fully downloaded from the Web server. Playback of the media file begins during the streaming of the file once the client has buffered a few seconds of content. The buffering provides a small backlog of information so the media can continue to play uninterrupted even during periods of high network congestion. With a progressive download, the client 102 retrieves data as fast as a Web server, the network and the client will allow without regard to the bit-rate parameter of the compressed media stream.

As a streaming media server, content server 104 can deliver media content to a client computer 102 actively and intelligently. The data is delivered at the data rate associated with the compressed media streams (e.g., audio and video streams), which is the exact real-time rate at which the data will be played back. The server 104 and client 102 communicate during the delivery process and the server can respond to feedback from the client. A streaming media server's "just-in-time" manner of delivering data preserves network bandwidth that can be used to service more clients.

Exemplary Embodiments

Figure 2:
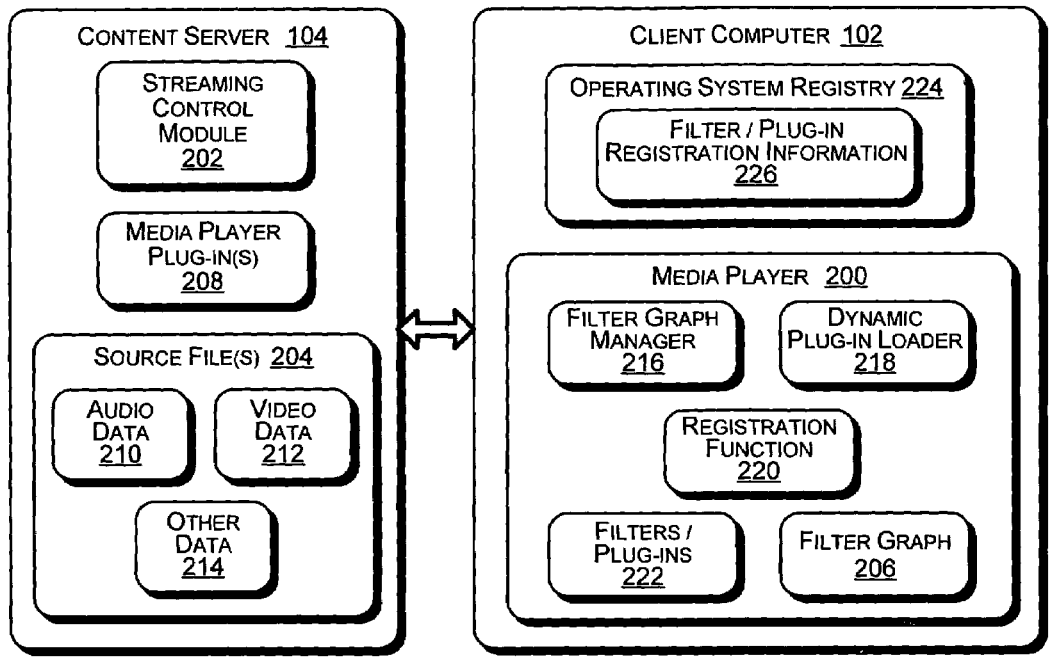
FIG. 2 illustrates an exemplary embodiment of a client computer and a content server suitable for registering a plug-in with a media player and for dynamically loading the plug-in into the media player.

FIG. 2 illustrates an exemplary embodiment of a client computer 102 and a content server 104 suitable for registering a plug-in with a media player and for dynamically loading the plug-in into the media player. As indicated above, the terms "plug-in" and "filter" are generally used interchangeably throughout this disclosure. However, the term filter is more apt to be used to refer to a plug-in once the plug-in has been installed and/or loaded in the media player 200, while prior to installation and/or loading into the media player 200, the term plug-in is more apt to be used.

Client computer 102 includes a media player 200 configured to access a streaming control module 202 on content server 104. Content server 104 includes one or more media source files 204 from which a selection can be made by media player 200. In the FIG. 2 embodiment, media content selections are made by media player 200 through the streaming control module 202 and selected source files 204 are streamed from the content server 104 to media player 200 on client computer 102. In addition, as mentioned above, in any number of other embodiments media content can also be accessed by client computer 102 from a standard Web server via a file download, or from a local source such as, for example, a DVD, a CD, a memory card, an email attachment stored on a local hard drive, and so on. Client computer 102 typically includes a buffer (not shown) that buffers media content received from content server 104. In general, media player 200 is configured to access and buffer streaming media content (i.e., source file 204) and to process and render the content through one or more filter graphs 206 for playback via media player 200 on client computer 102. In addition, media player 200 provides for the registration of media player plug-ins 208 and the dynamic insertion of plug-ins 208 into a filter graph 206. A more detailed discussion of registering media player plug-ins 208 with media player 200 and dynamically inserting plug-ins into a filter graph 206 is provided herein below.

In the embodiment of FIG. 2, source files 204 can be stored on content server 104 and streamed to media player 200 in accordance with any of a variety of different streaming media formats. These formats can include audio formats (e.g., audio data 210), audio-video formats (e.g., video data 212), or various other formats (e.g., other data 214) now existing or yet to be created by a content provider. For example, media can be streamed in accordance with the ASF format (Advanced Systems Format or Advanced Streaming Format). Additional information regarding ASF is available from Microsoft® Corporation of Redmond, Wash. Alternatively, or in conjunction with the ASF format, other streaming media formats may be used such as WMA (Windows Media Audio), WMV (Windows Media Video), MPEG (Moving Pictures Experts Group)-1, MPEG-2, MPEG-4, Quicktime, and so on.

Also illustrated as part of media player 200 in the client computer 102 of FIG. 2, are filter graph manager 216, dynamic plug-in loader 218, registration function 220, filters/plug-ins 222, and filter graph 206. It is noted that these components are illustrated as part of media player 200 for purposes of illustration and discussion only. In general, such components comprise various modules (or combinations of modules) having computer/processor executable instructions that may be located in one or more memories (not illustrated) of client computer 102. Client computer 102 also includes an operating system registry 224 having associated filter/plug-in registration information 226. As discussed further herein below, the filter/plug-in registration information 226 generally comprises a formatted data structure.

Media player 200 generally controls and processes multimedia data from a source file 204, for example, by using modular functional components called filters 222 connected in a filter graph 206. Filter graph manager 216 controls the assembly of a filter graph 206 and manages the flow of data streams within the filter graph 206 by directing the movement of data through the filter components of the filter graph 206.

The filter graph manager 216 supports the construction of a filter graph 206 by searching for enabled filters (plug-ins) 222 that can process a particular media type. Thus, the filter graph manager 216 determines a media type for a data stream received by the media player 200 and reads the filter/plug-in registration information 226 in the registry 224 to determine appropriate filters that are available (enabled) for processing the data stream. The filter graph manager 216 creates an instance of a class of filters appropriate for rendering the data stream where each filter in the class of filters is operative to conduct a processing operation. The filter graph manager 216 constructs a filter graph 206 by connecting filter components into a series of filters beginning with a source filter and ending with a rendering filter.

The filter/plug-in registration information 226 is preferably maintained as a portion of a registry 224 of the operating system of client computer 102. The registration information 226 contains listings defining the characteristics of filters 222 that are enabled or available for processing data. When a plug-in 208 from a server 104 (i.e., a Web server), for example, is downloaded and installed on client computer 102 for use as a filter 222 in media player 200, it invokes a registration function 220 or API (application programming interface) of the media player 200. The registration function 220 specifies a set of registration parameters that define the characteristics in the filter/plug-in registration information 226 of registry 224. Upon installation, the plug-in 208 passes the specified registration parameters to the registration function 220. The registration function 220 stores the registration parameters in a specific format into the registry 224 as filter/plug-in registration information 226.

The registration parameters that make up the filter/plug-in registration information 226 in registry 224 are as follows (following each parameter is a brief description of the parameter):

pwszFriendlyName: Pointer to a wide character null-terminated string containing the friendly name of the plug-in. This is also the name that displays to the user.

pwszDescription: Pointer to a wide character null-terminated string containing the description of the plug-in. This information also displays to the user.

pwszUninstallString: Pointer to a wide character null-terminated string containing the uninstall string.

dwPriority: Integer value containing the priority position of the plug-in in the chain of currently enabled plug-ins.

guidPluginType: GUID (globally unique identifier) specifying plug-in type as defined in the Player SDK (software development kit).

Clsid: The class ID (identifier) of the plug-in.

cMediaTypes: Count of media types supported by the plug-in as defined in the DirectX SDK.

pMediaTypes: Pointer to an array of media types that enumerates the supported media types. Media types are stored as type/subtype pairs as defined in the DirectX SDK (http://www.microsoft.com/windows/directx).

The registration function 220 stores the registration parameters in a specific format into the registry 224 as filter/plug-in registration information 226 on both a machine wide basis and on a per user basis. The machine wide basis storage is a portion of the registry 224 called HKLM that is accessible based on certain permissions, and changes made to information in HKLM impact all users globally. The format specified for storing the registration parameters on a machine wide basis is as follows:

```
PLUG-IN_TYPE (Plugin)
   PLUG-IN_MAJOR_FORMAT (GUID)
      PLUG-IN_MINOR_FORMAT (GUID)
         <List of registered plug-ins by ID> (GUIDs)
PLUG-IN_TYPE_CONFIGS (Plugin)
   PLUG-IN_ID (GUID)
      DESCRIPTION (string)
      NAME    (string)
      PRIORITY    (string)
      UNINSTALLPATH(string)
```

One example of how registration parameters might appear when stored in this specific format is as follows:

```
DSP
   {73646976-0000-0010-8000-00AA00389B71} (audio)
      {32315659-0000-0010-8000-00AA00389B71} (PCM)
         {E3B9A888-E9EB-403B-A121-7012C3FD889C}  (Plug-in
from vendor Y)
DSPConfig
   {E3B9A888-E9EB-403B-A121-7012C3FA889C} (Vendor Y plug-
in ID)
   Description:  Highlights Athletic Shoes in Video
   Name:     Product Highlighter
Priority:     9
UninstallPath:  C:\mediaplayer\uninstaller
```

The registration function 220 also stores certain registration parameters in a specific format into the registry 224 as filter/plug-in registration information 226 on a per user basis. The per user basis storage is a portion of the registry 224 called HKCU which represents personal settings for a current user. This enables individual users on a machine with separate accounts to customize playback configurations and plug-in settings (such as whether a plug-in is enabled or disabled and what its priority is in the playback chain). The format specified for storing the registration parameters on a per user basis is as follows:

```
PLUG-IN_TYPE_CONFIGS
   PLUG-IN_ID (GUID)
      ENABLED (bool)
      PRIORITY (integer)
```

As indicated above, the filter graph manager 216 reads the filter/plug-in registration information 226 in the registry 224 to determine appropriate filters that are available (enabled) for processing a data stream of a particular data type. The filter graph manager 216 constructs a filter graph 206 by connecting filter components into a series of filters beginning with a source filter and ending with a rendering filter.

Figure 3:
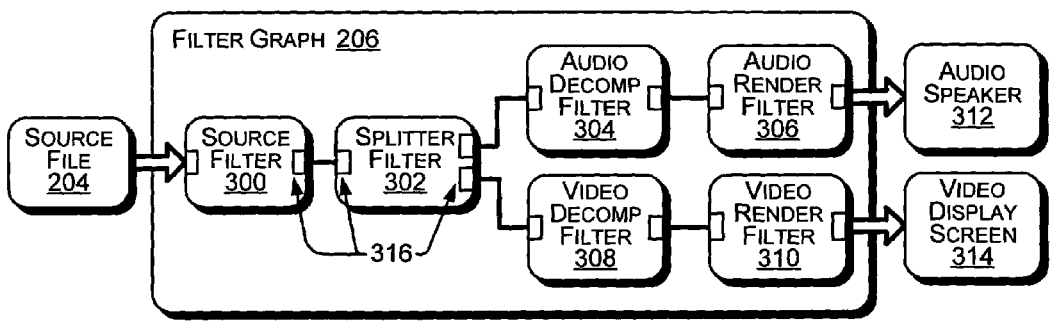
FIG. 3 illustrates an example of a filter graph.

A filter graph, such as the filter graph 206 illustrated in FIG. 3, typically comprises a linked collection of filter components 222 of different types. In general, filters 222 can be categorized into one of three filter types: a source filter, a transform filter, or a renderer filter. A source filter 300 accepts and reads data 11 from a source, such as a source file 204 streaming from a content server 104. Thus, the source filter 300 introduces the source data into the filter graph 206.

A transform filter accepts the data from the source filter 300, processes the data, and forwards the processed data to a renderer filter (e.g., filters 306 and 310). Transform filters, also called DSP (digital signal processing) filters, encompass a variety of transformation functions, including splitting a single data stream into multiple data streams (i.e., a splitter filter 302), merging two or more data streams into a single data stream, decompressing data streams (e.g., audio decompression filter 304, video decompression filter 308), processing data streams to cause a particular desired effect in the playback of the rendered data streams, and so on. In general, DSP or transform filters modify or process data that is in a data format already known to the media player 200.

A rendering filter (e.g., audio rendering filter 306, video rendering filter 310) renders the data to a form that is useful in driving a hardware device such as an audio speaker 312 or a video display screen 314. Thus, rendered output is typically supplied to a hardware device (e.g., speaker 312, display screen 314), but could also be supplied to any location that accepts media input (such as a file maintained on a volatile memory, optical disk, hard disk, etc.). Although media players typically include rendering filters that comprehend audio and video media types, content providers are continually generating new or custom media types that will not be natively understood by a media player. Accordingly, software vendors create various rendering filters capable of rendering new, different and unique media types. Such rendering plug-ins can be installed in a media player to allow the media player to render the new media types whose formats are not natively known to the media player. An example of a new media type that may not be natively supported by a media player might be streaming stock ticker data in a text format. A vendor could develop a rendering plug-in to be installed and loaded into a media player that causes the streaming stock ticker data to appear in one area of a video display, while other video data being processed through a video renderer filter 310 appears in the rest of the video display.

It is noted that the filter graph 206 shown in FIG. 3 represents only one of many possible constructions of filter graphs and is not intended as a limitation on the architecture of filter graphs in general. Furthermore, although three basic types of filters are described above, those skilled in the art will appreciate that a filter can represent a combination of different filter types.

Filters 222 of a filter graph 206 architecture (e.g., filters 300-310, FIG. 3) are preferably implemented as COM objects, each implementing one or more interfaces, each of which contains a predefined set of functions called methods. Methods are called by the media player 200 or other component objects in order to communicate with the object exposing the interface. The filter graph manager 216 can control a media data stream by allowing the media player 200 to specify certain activities, such as starting, pausing, or stopping the media stream, playing for a particular duration or seeking to a particular point in the data stream. The filter graph manager 216 then calls appropriate methods on the filters 222 to invoke them.

In addition to filter components 222, filter graphs 206 also have pins 316. For each data stream that the filter 222 (e.g., filters 300-310, FIG. 3) handles, it exposes at least one pin 316. A pin can be implemented as a COM object that represents a point of connection for a unidirectional data stream on a filter. Input pins represent inputs and accept data into the filter, and output pins represent 11 outputs and provide data to other filters. Pins 316 can provide interfaces to connect with other pins and for transporting data. The pin interfaces support the transfer of time-stamped data using shared memory, the negotiation of data formats at each pin-to-pin connection, and buffer management and buffer allocation negotiation for minimizing data copying and maximizing throughput.

As shown in FIG. 3, a source filter 300 provides one output pin 316 indicating there is one stream of data in the source file 204. A source filter 300 will have as many output pins 316 as there are data streams in a source file 204. A splitter filter 302 (i.e., transform filter), provides one input pin and two output pins. An audio renderer filter 306 exposes only one input pin.

In addition to the filter graph manager 216 that controls the initial assembly of a filter graph 206 and manages the flow of data streams within the filter graph 206, the media player 200 includes a dynamic plug-in loader 218 for dynamically loading filters while data streams are being processed. Referring again to FIG. 2, the filter graph manager 216 generally constructs a filter graph at the start of a data stream when a media type for the data stream is recognized. The dynamic plug-in loader 218, however, is configured to dynamically insert a filter 222 into a filter graph 206 during the processing of the data stream through the filter graph 206. Thus, the media player uses both the filter graph manager 216 and the dynamic plug-in loader 218 to manipulate filters within a filter graph 206.

In one implementation, the dynamic plug-in loader 218 is invoked by the media player 200 during playback or processing of one or more data streams of a known media type from a source file 204. Media player 200 invokes the dynamic plug-in loader 218 in response to a user input instruction to the media player 200 asking the media player 200 to insert a DSP plug-in 222. An example scenario 11 would include one in which a user is watching a music video on the media player 200 while surfing the Web from client computer 102. The user may locate, purchase, download, and install an audio plug-in 208 from a Web-based software vendor (e.g., content server 104). The audio plug-in 208 might provide an interesting audio effect the user desires, such as creating a surround sound effect from 2 computer speakers, for example. During the installation of the audio plug-in, the media player 200 continues to play the music video. After installation is complete, the user selects a menu item of the media player 200 with the intention of loading the newly acquired audio plug-in and experiencing its audio effect.

Figure 4:
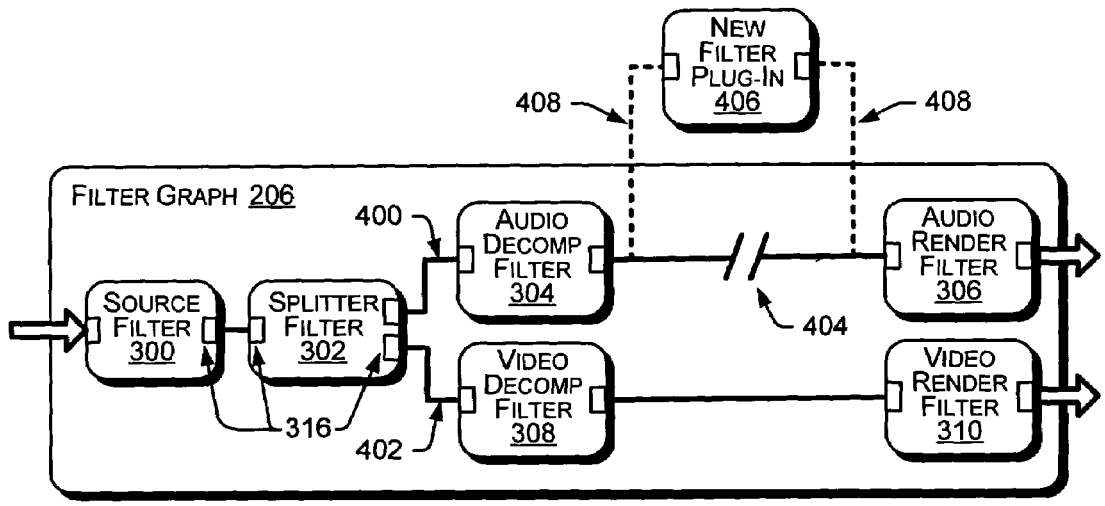

The dynamic and automatic loading of the newly installed plug-in can be described with reference to the filter graph 206 of FIG. 4. As described above, during installation of a plug-in 208, the registration function 220 stores the registration parameters for the plug-in in a specific format into the registry 224 as filter/plug-in registration information 226. Referring to FIG. 2 and the graph of FIG. 4, when invoked by the media player 200, the dynamic plug-in loader 218 automatically interrupts or stops the filter graph 206 from playing back (i.e., processing) the audio data stream 400 and the video data stream 402 (e.g., the music video). The dynamic plug-in loader 218 automatically saves the current position of the data streams 400 and 402, reads the registration information 226 in registry 224, locates the newly acquired plug-in based on the registration parameters stored during installation of the plug-in, deconstructs 404 the filter graph 206, inserts the new plug-in filter 406 into the graph according to its priority parameter (i.e., dwPriority), reconnects 408 the filter graph including the new filter plug-in 406, and restarts the playback of the data streams 400 and 402 through the filter graph at the same location where playback was interrupted.

Figure 5:
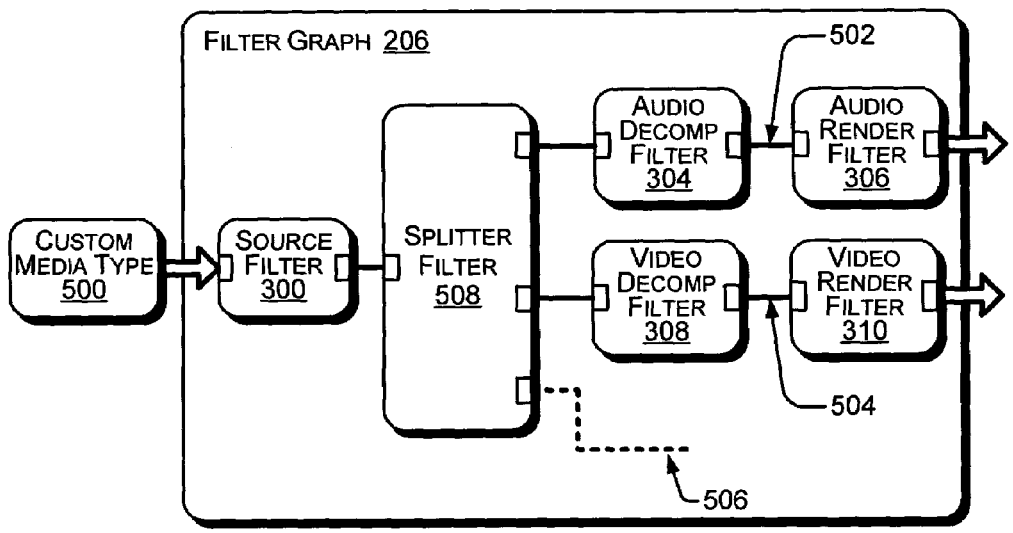
FIG. 5 illustrates an example of a filter graph that has been constructed by a filter graph manager to process known data streams of a custom data file.

In another implementation, described with reference to the filter graph 206 of FIG. 5, the dynamic plug-in loader 218 is invoked by the media player 200 during playback or processing of a custom media data file 500. FIG. 5 is intended to illustrate that the filter graph 206 has been initially constructed by filter graph manager 216 to process the known data streams of custom data file 500. That is, media player 200 includes native rendering filters (306, 310) that know how to render an audio data stream 502 and a video data stream 504 from custom media file 500.

However, the custom media data file 500 also includes a custom data stream 506 that the filter graph of FIG. 5 is unable to process without installing and loading a custom DSP plug-in and custom rendering plug-in. The custom DSP plug-in and custom rendering plug-in may be available, for example, from a Web site of an advertiser/content provider who is providing the custom media data file 500. Without the custom DSP and rendering plug-ins, the user playing the custom data file 500 is experiencing only the basic information from the file 500 (i.e., audio data stream 502 and video data stream 504) and is missing the special effects otherwise generated by the missing custom data stream 506. This third, custom data stream 506 is illustrated in FIG. 5 by the dotted line being imaginarily parsed by splitter filter 508.

In this scenario, the custom data file 500 could be a video commercial advertising a popular new product that is expressed in a unique way by the custom data file 500. For example, the new product might be an innovative cross-trainer athletic shoe. The basic audio 502 and video 504 data streams from the custom file 500 might show a star basketball player wearing the shoe while performing some spectacular athletic endeavors. The custom data stream 506 may provide information capable of highlighting the new cross-trainer athletic shoe and creating a "hotspot" that travels with the shoe as the basketball player performs in the video. A hotspot is an interactive location on the screen that a user can click on or otherwise activate to link to additional media related to the content of the hotspot. Therefore, while the filter graph 206 of FIG. 5 allows a user to experience the basic audio and video portion of the custom media file 500 advertisement, without an intended custom DSP video plug-in and custom rendering plug-in to process the custom data stream 506, the user in unable to experience the visual highlighting effects or access the additional information about the athletic shoe by clicking on the "hotspot".

Figure 6:
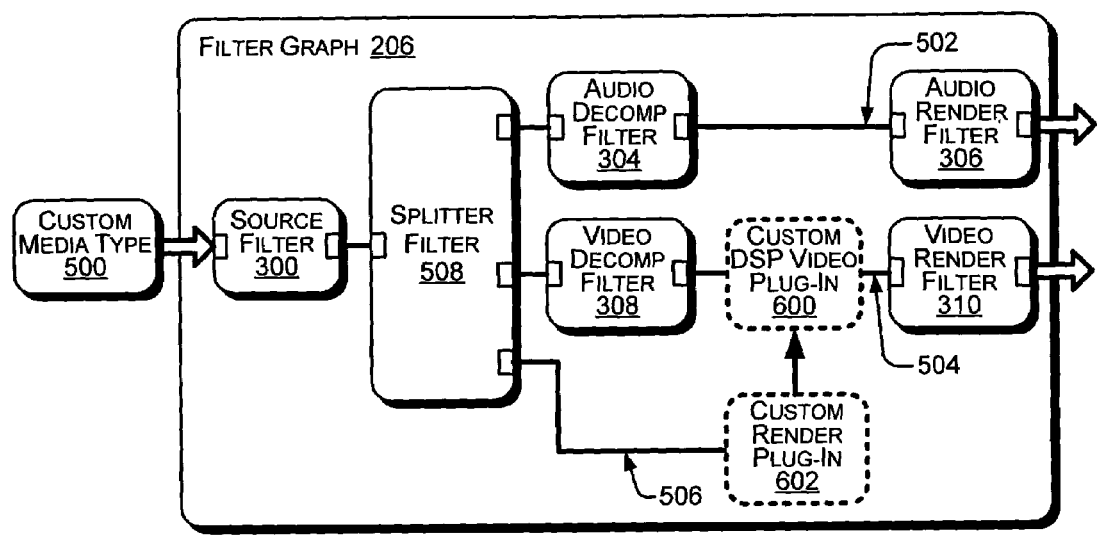
FIG. 6 illustrates an example of a filter graph showing how a dynamic plug-in loader can be invoked to dynamically and automatically load plug-ins.

FIG. 6 illustrates an example of how the dynamic plug-in loader 218 can be invoked to dynamically and automatically load plug-ins such as the custom DSP video plug-in 600 and rendering plug-in 602 that are discussed with reference to FIG. 5, but that are not present in the filter graph of FIG. 5. The filter graph 206 of FIG. 6 assumes that a user, while watching the audio 502 and video 504 data streams from the custom data file 500, locates, downloads, and installs the custom DSP video plug-in 600 and custom rendering plug-in 602 that were created for processing the custom data stream 506 of custom data file 500.

As described above, the registration function 220 called by a plug-in when the plug-in is installed receives specified registration parameters and stores the parameters in a specific format into the registry 224 as filter/plug-in registration information 226. The dynamic plug-in loader 218 is called by the media player 200 based on a user inputting an instruction requesting that the custom DSP video plug-in 600 and custom rendering plug-in 602 be loaded in the media player 200. The media player 200 invokes the dynamic plug-in loader 218 in response to the 11 user input instruction and changes an entry register 224 in the registration information to "enable" the newly installed custom DSP video plug-in 600 and custom rendering plug-in 602. The dynamic plug-in loader 218 automatically interrupts/stops the FIG. 6 filter graph 206 from playing back (i.e., processing) the audio data stream 502 and video data stream 504 from the custom data file 500 and saves the current playback locations of the data streams. The dynamic plug-in loader 218 reads the registration information 226 in registry 224 to determine which plug-ins are enabled and what their priority is in the graph. In this case, the dynamic plug-in loader 218 finds that the custom DSP video plug-in 600 and custom rendering plug-in 602 are enabled. The dynamic plug-in loader 218 deconstructs the filter graph, inserts the custom DSP video plug-in 600 and custom rendering plug-in 602 into the graph according to their priority parameters (i.e., dwPriority), reconnects the filter graph including the new filter plug-ins 600 and 602, and restarts the playback of the data streams from the custom data file 500 through the filter graph at the same location where playback was interrupted. The dynamic loading of the custom DSP video plug-in 600 and custom rendering plug-in 602 is automatic and creates a virtually seamless media presentation experience for the user.

When the dynamic plug-in loader 218 restarts playback processing of the data streams from the custom media file 500, the playback includes the effects of the custom data stream 506 being processed by the custom DSP video plug-in 600 and custom rendering plug-in 602. In this particular example, the custom DSP video plug-in 600 is capable of altering the video data stream 504 such that the cross-trainer athletic shoe being advertised is highlighted and becomes more visible to the viewer. Because video data makes up a series of pictures, the custom DSP video plug-in 600 is able to "see" every picture in a video sequence and can transform or modify the video by altering each video picture frame in a specific way. In this case, the custom video plug-in 600 highlights the athletic shoe. However, the custom video plug-in 600 needs to know where in each video picture frame the athletic shoe is located. This can be accomplished by the custom rendering plug-in 602 interpreting and processing the custom data stream 506. The custom data stream 506 contains information that the custom rendering plug-in 602 uses to tell the custom DSP video plug-in 600 where the athletic shoe is located within each video frame. In addition, the custom data stream 506 includes information that the custom rendering plug-in 602 can interpret to create a "hotspot" in the video that follows the athletic shoe. As mentioned above, the hotspot is an interactive location on the screen that a user can click on to activate a link to additional media related to the athletic shoe or other content associated with the hotspot.

Exemplary Methods

Example methods for registering and dynamically loading media player plug-ins will now be described with primary reference to the flow diagrams of FIGS. 7-10. The methods apply generally to the exemplary embodiments discussed above with respect to FIGS. 2-6. The elements of the described methods may be performed by any appropriate means including, for example, by hardware logic blocks on an ASIC or by the execution of processor-readable instructions defined on a processor-readable storage medium.

A "processor-readable storage medium," as used herein, can be any means that can store instructions for use by or execution by a processor. A processor-readable storage medium can be, without limitation, an electronic, magnetic, optical, electromagnetic, infrared, or semiconductor system, apparatus, or device. More specific examples of a processor-readable storage medium include, among others, a portable computer diskette (magnetic), a random access memory (RAM) (magnetic), a read-only memory (ROM) (magnetic), an erasable programmable-read-only memory (EPROM or Flash memory), a rewritable compact disc (CD-RW) (optical), and a portable compact disc read-only memory (CDROM) (optical).

Figure 7:
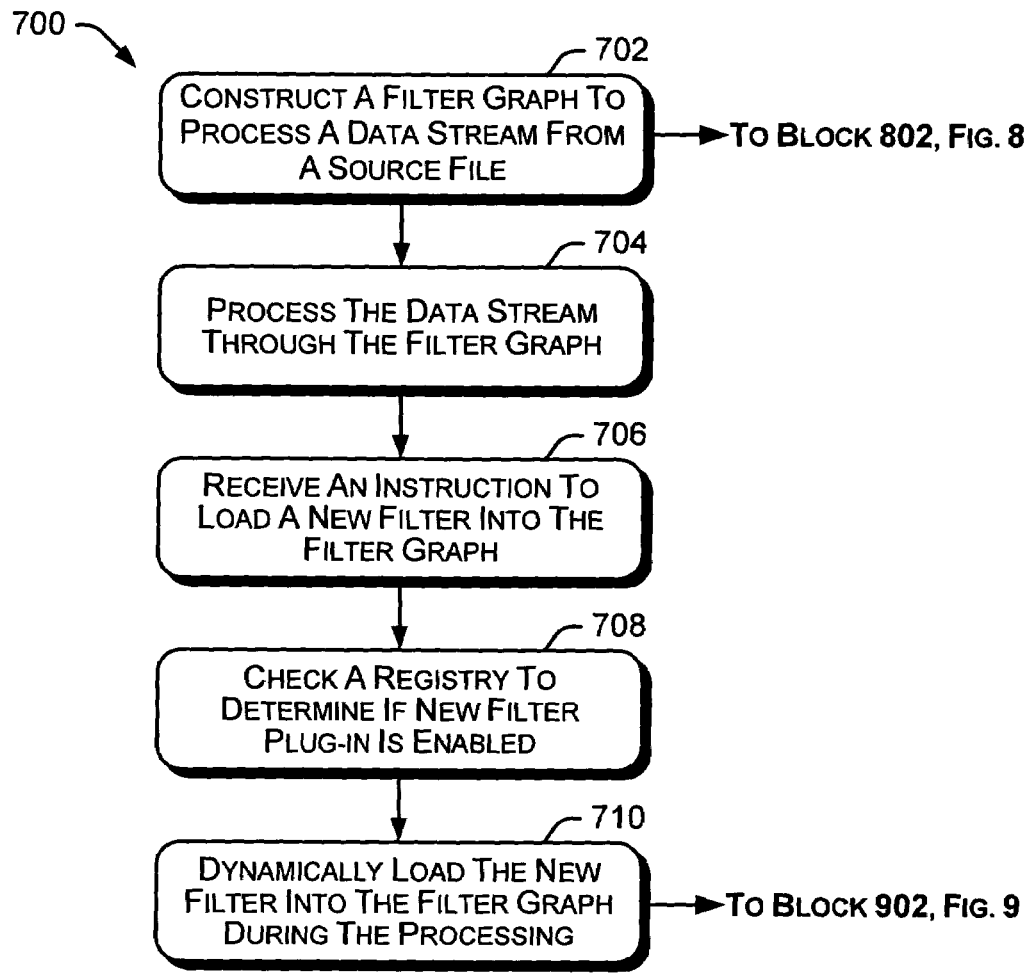
FIGS. 7-10 illustrate block diagrams of exemplary methods for registering and dynamically loading media player plug-ins.

FIG. 7 shows an exemplary method 700 for dynamically loading a media plug-in into a media player 200. At block 702, a filter graph is constructed to process a data stream from a source file. The source file is typically being streamed from a content server or other source device. A filter graph manager on the media player 200 is constructing the filter graph based on the type of data in the data stream. For example, if the data stream is audio data, the filter graph will include an audio decompression filter and an audio rendering filter in the filter graph. Selection of the filters for the graph is made based on filter information stored in a registry such as an operating system registry. Further details of the filter graph construction are included in method 800 illustrated in FIG. 8.

At block 704 of method 700, the data stream is processed through the filter graph. Processing the data stream through the filter graph means that each filter in a constructed chain of filters performs some processing function on the data before passing the data on to the next filter in the chain of filters. The processing typically begins with a source filter and ends with a rendering filter.

At block 706, the media player receives an instruction to load a new filter into the filter graph. The instruction is input to the media player by a user wanting to load a new filter plug-in into the filter graph during the processing of the current data stream. A typical scenario is one in which a user locates a desired filter plug-in on the Internet while listening to music through a media player 200 on a client computer 102. The user purchases, downloads and installs the plug-in, and then selects the plug-in for loading from a menu of the media player 200. Installation of the plug-in registers it with the media player 200 so that it can be recognized by the player. The instruction to load the filter plug-in enables the plug-in in the registry and causes the media player to call a dynamic plug-in loader function.

At block 708, the dynamic plug-in loader checks the registry to determine which filter plug-ins are enabled. The dynamic plug-in loader will recognize the new filter plug-in based on plug-in information stored in the operating system registry, and will find that the newly installed filter plug-in has been enabled. At block 710, the dynamic plug-in loader loads the new filter plug-in into the filter graph during processing of the data stream. Dynamic loading indicates, at least in part, that the media player 200 is not closed during the loading of the filter plug-in, that playback of the data stream picks up right where it left off, and that playback is restarted automatically without user input. The method of dynamically loading is further described in method 900 of FIG. 9.

Figure 8:
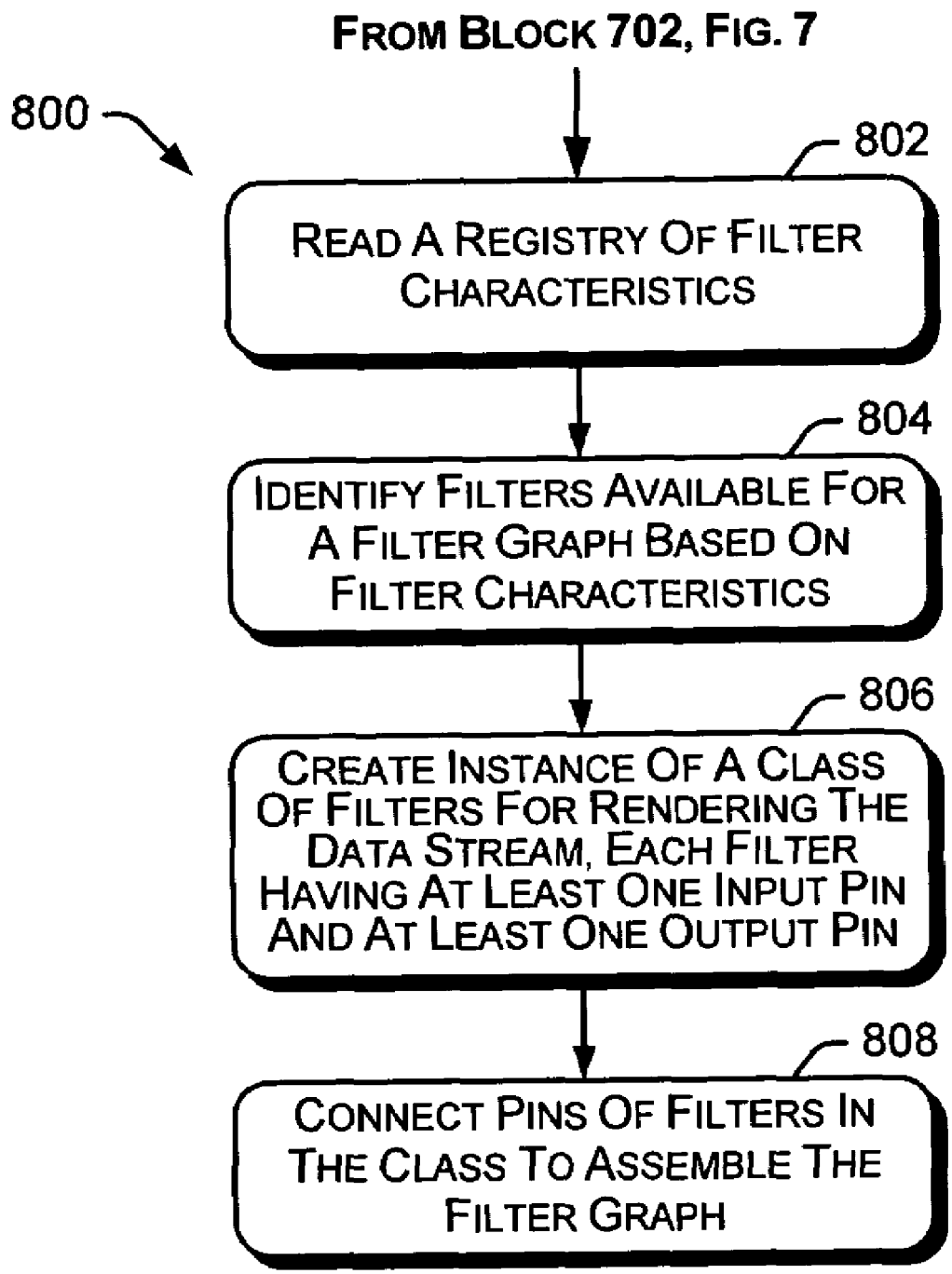

FIG. 8 shows a method 800 that is a continuation of the method 700 of dynamically loading a media plug-in into a media player from FIG. 7. Block 802 continues from block 702 of method 700. At block 802, a registry of filter plug-in characteristics is read. The registry is typically an operating system registry containing filter plug-in information that a filter graph manager uses to determine which filters are available for processing a particular type of data stream being received by the media player 200. At block 804, the filter graph manager identifies filters that are available for the filter graph based on the filter plug-in characteristics listed in the registry.

At block 806, an instance for a class of filter for rendering the data stream is created. Each filter in the class of filters is operative to conduct a processing operation on the data stream and each filter has at least one input pin and at least one output pin. At block 808, the pins of the filters are connected to assemble the filter graph into a chain or chains of filters.

Figure 9:
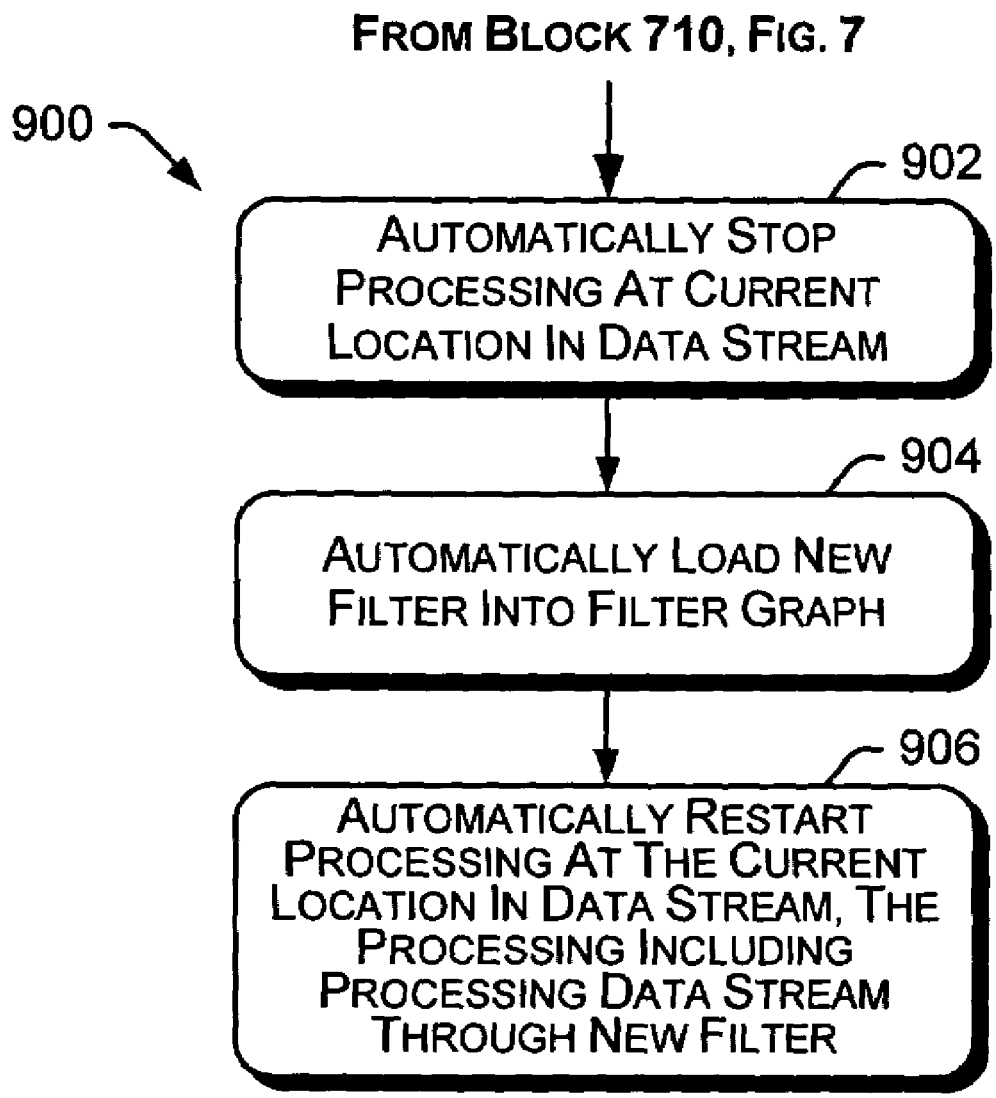

FIG. 9 shows a method 900 that is a continuation of the method 700 of dynamically loading a media plug-in into a media player from FIG. 7. Block 902 continues from block 710 of method 700. At block 902, the processing of a data stream by the filter graph of a media player is automatically stopped. At block 904, the new filter plug-in is automatically loaded into the filter graph. The automatic loading of the filter plug-in includes deconstructing the filter graph at a connection point between two filters in the graph. The new filter plug-in is then inserted into the graph between the two filters at the connection point. The filter graph is then reconstructed by connecting the new filter plug-in into the graph at the connection point. At block 906, the filter graph is automatically restarted to process the data stream at the location in the data stream where processing had stopped to load the new filter plug-in. The restarted processing now includes the processing function of the new filter plug-in that has just been loaded into the filter graph.

Figure 10:
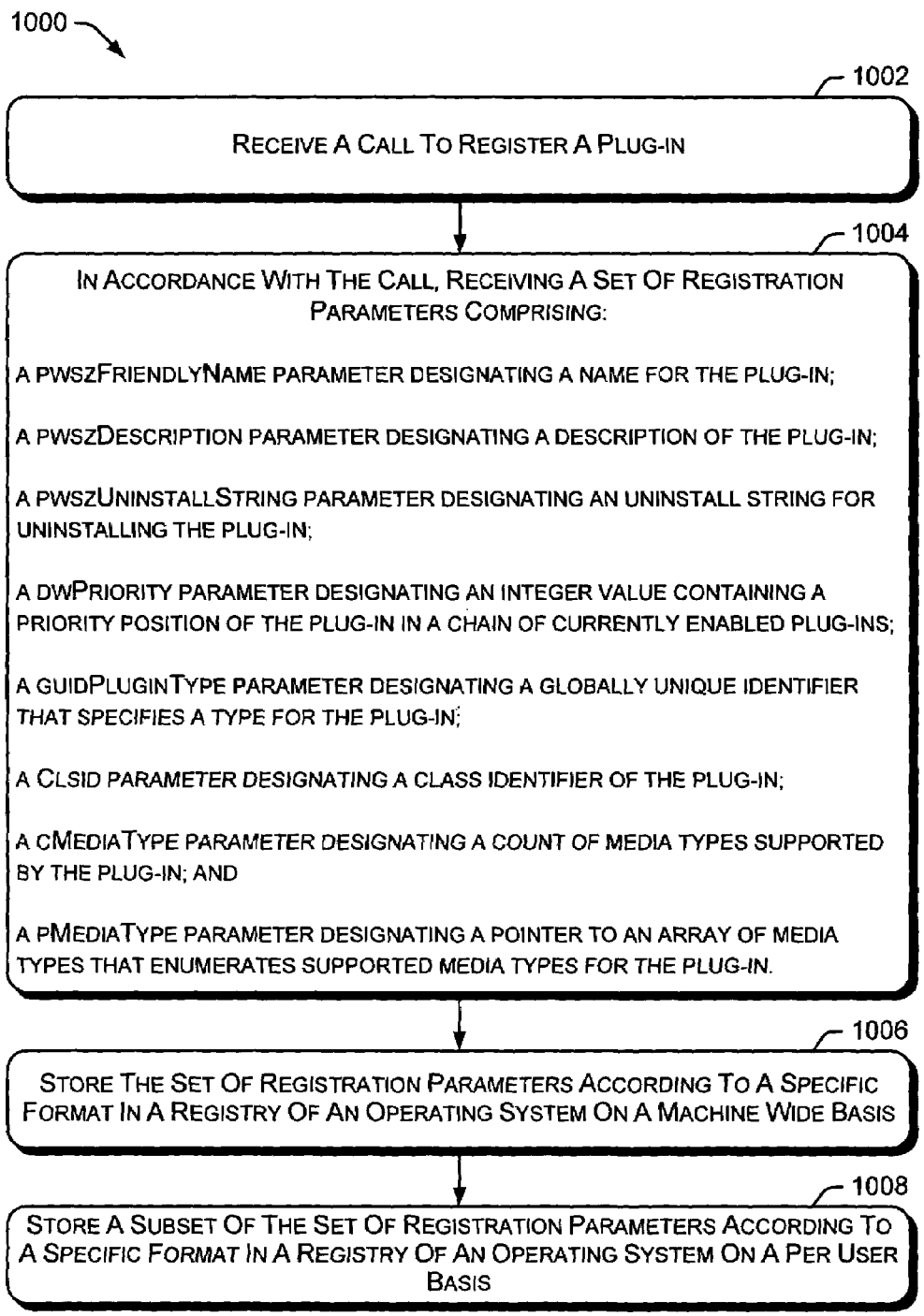

FIG. 10 shows an exemplary method 1000 for registering a media plug-in with a media player 200. At block 1002, a registration function of a media player receives a call to register a plug-in. The registration function specifies a set of registration parameters to be provided by the plug-in. At block 1004, the registration function receives the registration parameters, which comprise the following:

a pwszFriendlyName parameter designating a name for the plug-in;

a pwszDescription parameter designating a description of the plug-in;

a pwszUninstallString parameter designating an uninstall string for uninstalling the plug-in;

a dwPriority parameter designating an integer value containing a priority position of the plug-in in a chain of currently enabled plug-ins;

a guidPluginType parameter designating a globally unique identifier that specifies a type for the plug-in;

a Clsid parameter designating a class identifier of the plug-in;

a cMediaType parameter designating a count of media types supported by the plug-in; and a pMediaType parameter designating a pointer to an array of media types that enumerates supported media types for the plug-in.

At block 1006, the registration function stores the set of registration parameters according to a specific format in the registry of the operating system on a machine wide basis.

As block 1008, the registration function stores the set of registration parameters according to a specific format in the registry of the operating system on a per user basis.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 11:
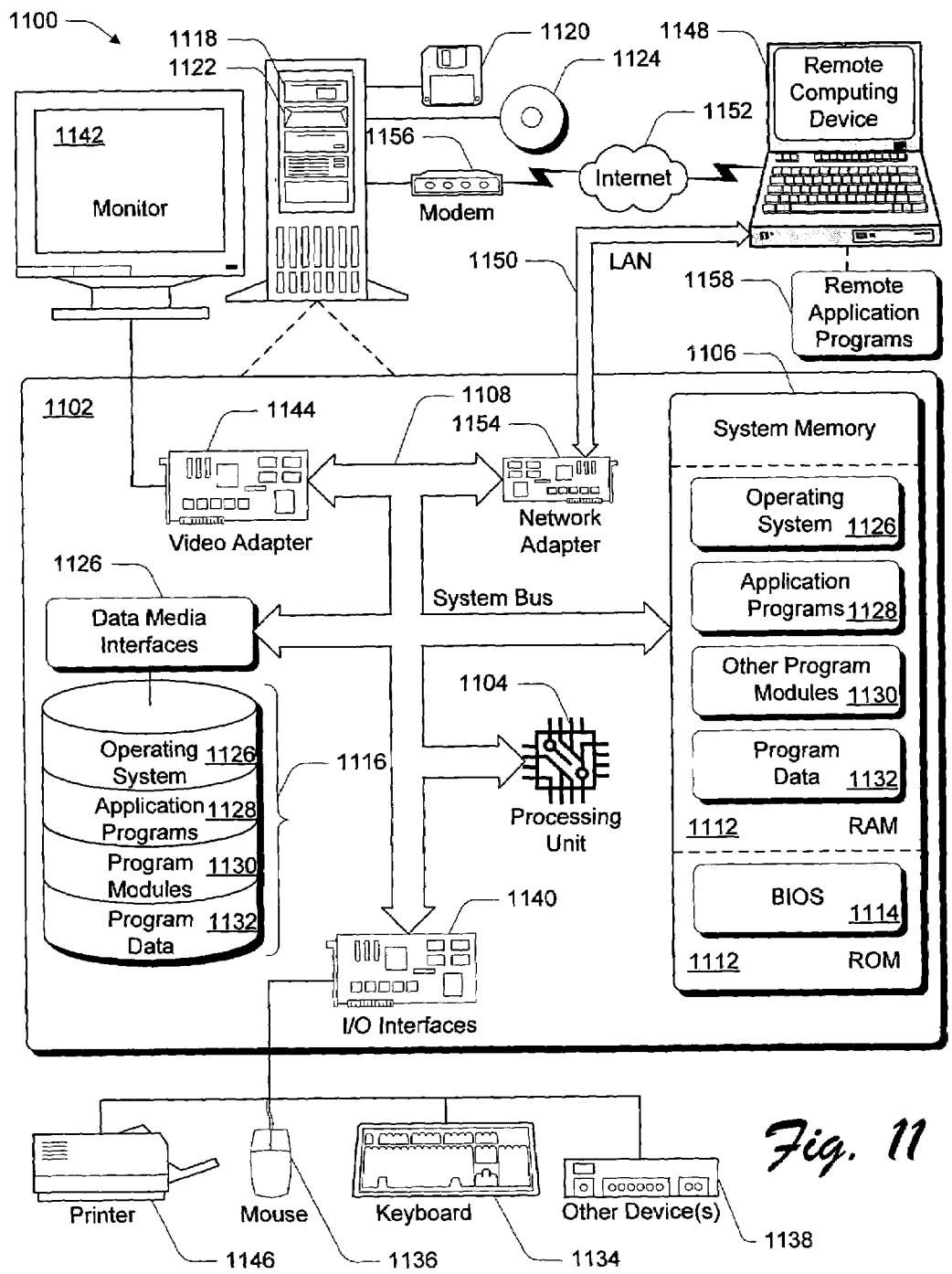
FIG. 11 illustrates an exemplary computing environment suitable for implementing a client computing device and a content server computing device.

FIG. 11 illustrates an exemplary computing environment suitable for implementing a client computing device 102 and a content server computing device 104. Although one specific configuration is shown, client computing device 102 and content server computing device 104 may be implemented in other computing configurations.

The computing environment 1100 includes a general-purpose computing system in the form of a computer 1102. The components of computer 1102 can include, but are not limited to, one or more processors or processing units 1104, a system memory 1106, and a system bus 1108 that couples various system components including the processor 1104 to the system memory 1106.

The system bus 1108 represents one or more of any of several types of bus structures, including a memory bus or memory controller, a peripheral bus, an accelerated graphics port, and a processor or local bus using any of a variety of bus architectures. An example of a system bus 1108 would be a Peripheral Component Interconnects (PCI) bus, also known as a Mezzanine bus.

Computer 1102 typically includes a variety of computer readable media. Such media can be any available media that is accessible by computer 1102 and includes both volatile and non-volatile media, removable and non-removable media. The system memory 1106 includes computer readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 can also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1126. Alternatively, the hard disk drive 1116, magnetic disk drive 1118, and optical disk drive 1122 can be connected to the system bus 1108 by a SCSI interface (not shown).

The disk drives and their associated computer-readable media provide non-volatile storage of computer readable instructions, data structures, program modules, and other data for computer 1102. Although the example illustrates a hard disk 1116, a removable magnetic disk 1120, and a removable optical disk 1124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE- PROM), and the like, can also be utilized to implement the exemplary computing system and environment.

Any number of program modules can be stored on the hard disk 1116, magnetic disk 1120, optical disk 1124, ROM 1112, and/or RAM 1110, including by way of example, an operating system 1126, one or more application programs 1128, other program modules 1130, and program data 1132. Each of such operating system 1126, one or more application programs 1128, other program modules 1130, and program data 1132 (or some combination thereof) may include an embodiment of a caching scheme for user network access information.

Computer 1102 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1102 via 11 input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device can also be connected to the system bus 1108 via an interface, such as a video adapter 1144. In addition to the monitor 1142, other output peripheral devices can include components such as speakers (not shown) and a printer 1146 which can be connected to computer 1102 via the input/output interfaces 1140.

Computer 1102 can operate in a networked environment using logical connections to one or more remote computers, such as a remote computing device 1148. By way of example, the remote computing device 1148 can be a personal computer, portable computer, a server, a router, a network computer, a peer device or other common network node, and the like. The remote computing device 1148 is illustrated as a portable computer that can include many or all of the elements and features described herein relative to computer system 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet. When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which can be internal or external to computer 1102, can be connected to the system bus 1108 via the input/output interfaces 1140 or other appropriate mechanisms. It is to be appreciated that the illustrated network connections are exemplary and that other means of establishing communication link(s) between the computers 1102 and 1148 can be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components, such as the operating system, are illustrated herein as discrete blocks, although it is recognized that such programs and components reside at various times in different storage components of the computer system 1102, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-readable storage medium comprising processor-executable instructions to be executed by one or more processors to perform a method comprising:

constructing a filter graph to process a data stream from a source file which is received by a media player;

processing the data stream through the filter graph;

receiving an instruction from a user to load a new filter into the filter graph, wherein the new filter is new to the media player and modifies data of the data stream;

registering the new filter with the media player when the new filter is installed, such that the new filter can be recognized by the media player for loading based on registration parameters stored in a registry, and such that the new filter cannot subsequently be pirated for use on other types of media players;

recognizing the new filter based on the registration parameters stored in the registry;

dynamically loading the new filter into the filter graph during the processing of the data stream through the filter graph in response to the instruction received from the user;

after dynamically loading the new filter into the filter graph, processing the data stream through the filter graph which includes the new filter; and communicating information represented by the data stream to the user via the media player.

2. A processor-readable storage medium as recited in claim 1, wherein the constructing a filter graph comprises:

reading a registry of filter characteristics;

identifying a plurality of filters available for operation in a filter graph based on the filter characteristics;

creating from the plurality of filters, an instance of a class of filters appropriate for rendering the data stream, each filter in the class of filters operative to conduct a processing operation and having at least one input pin and at least one output pin; and connecting the pins of the filters in the class of filters to assemble the filter graph, the filter graph comprising connected filters wherein the first filter in the filter graph accepts the data stream and the final filter in the filter graph renders the data stream.

3. A processor-readable storage medium as recited in claim 1, wherein the dynamically loading comprises:
- automatically stopping the processing at a current location in the data stream;
- automatically loading the new filter into the filter graph; and
- automatically restarting the processing at the current location in the data stream, the processing after the restarting including processing the data stream through the new filter.

4. A processor-readable storage medium as recited in claim 3, wherein the dynamically loading the new filter comprises:
- deconstructing the filter graph at a connection point between two filters;
- inserting the new filter at the connection point; and
- reconstructing the filter graph such that it includes the new filter inserted between the two filters.

5. A processor-readable storage medium comprising processor-executable instructions to be executed by one or more processors to perform a method comprising:
- constructing a filter graph to process a data stream from a source file which is received by a media player;
- processing the data stream through the filter graph;
- receiving an instruction from a user to load a new filter into the filter graph, wherein the new filter modifies the data of the data stream;
- receiving a call to register a plug-in when the new filter is installed, such that the new filter can be recognized by the media player for loading based on registration parameters stored in a registry, and such that the new filter cannot subsequently be pirated for use on other types of media players; and
- in accordance with the call, receiving a set of registration parameters comprising:
  - a pwszFriendlyName parameter designating a name for the plug-in;
  - a pwszDescription parameter designating a description of the plug-in;
  - a pwszUninstallString parameter designating an uninstall string for uninstalling the plug-in;
  - a dwPriority parameter designating an integer value containing a priority position of the plug-in in a chain of currently enabled plug-ins;
  - a guidPluginType parameter designating a globally unique identifier that specifies a type for the plug-in;
  - a Clsid parameter designating a class identifier of the plug-in;
  - a cMediaType parameter designating a count of media types supported by the plug-in; and
  - a pMediaType parameter designating a pointer to an array of media types that enumerates supported media types for the plug-in;
- registering the new filter with the media player using the set of registration parameters;
- recognizing the new filter based on the registration parameters stored in the registry;
- dynamically loading the new filter into the filter graph during the processing of the data stream through the filter graph in response to the instruction received from the user;
- after dynamically loading the new filter into the filter graph, processing the data stream through the filter graph which includes the new filter; and
- communicating information represented by the data stream to the user via the media player.

6. A processor-readable storage medium as recited in claim 5, comprising further processor-executable instructions configured for storing the set of registration parameters according to a specific format in a registry of an operating system on a machine wide basis.

7. A processor-readable storage medium as recited in claim 5, comprising further processor-executable instructions configured for storing a subset of the set of registration parameters according to a specific format in a registry of an operating system on a per user basis.

8. A processor-readable storage medium as recited in claim 5, comprising further processor-executable instructions configured for:
- constructing a filter graph to process a data stream from a source file;
- processing the data stream through the filter graph;
- receiving an instruction to load the plug-in;
- searching the registry for the plug-in;
- recognizing the plug-in based on the set of registration parameters stored in the registry; and
- dynamically loading the plug-in into the filter graph during the processing.

9. A processor-readable storage medium as recited in claim 5 having stored thereon a data structure providing a format for storing the registration parameters, the data structure comprising:
- a PLUG-IN_TYPE field configured to contain a registration parameter;
- a PLUG-IN_MAJOR_FORMAT field configured to contain a registration parameter;
- a PLUG-IN_MINOR_FORMAT field configured to contain a registration parameter;
- a PLUG-IN_TYPE_CONFIGS field configured to contain a registration parameter;
- a PLUG-IN_ID field configured to contain a registration parameter;
- a DESCRIPTION field configured to contain a registration parameter;
- a NAME field configured to contain a registration parameter;
- a PRIORITY field configured to contain a registration parameter; and
- a UNINSTALLPATH field configured to contain a registration parameter.

10. A processor-readable storage medium as recited in claim 5 having stored thereon a data structure providing a format for storing the registration parameters, the data structure comprising:
- a PLUG-IN_TYPE_CONFIGS field configured to contain a registration parameter;
- a PLUG-IN_ID field configured to contain a registration parameter;
- an ENABLED field configured to contain a registration parameter; and
- a PRIORITY field configured to contain a registration parameter.

11. A processor-readable storage medium as recited in claim 6, wherein the specific format comprises:
- a plug-in type specified by a guidPluginType parameter;
- a plug-in major format specified by a pMediaType parameter that further specifies the plug-in type;
- a plug-in minor format specified by another pMediaType parameter that further specifies the plug-in major format;
- a unique identification of a plug-in specified by a Clsid parameter, the unique identification identifying a plug-in capable of processing the plug-in minor format;

a configuration heading for the plug-in type that includes the unique identification of the plug-in specified by the Clsid parameter;

a description of the plug-in type specified by the pwszDescription parameter;

a name of the plug-in type specified by the pwszFriendlyName parameter;

a priority of the plug-in type specified by the dwPriority parameter; and an uninstall path specified by the pwszUninstallString parameter.

12. A processor-readable storage medium as recited in claim 7, wherein the specific format comprises:

a configuration heading for the plug-in type that includes the unique identification of the plug-in specified by the Clsid parameter;

an enable indicator permitting the user to enable the plug-in; and a priority of the plug-in type specified by the dwPriority parameter.

13. A processor-readable storage medium as recited in claim 8, wherein the dynamically loading comprises:

automatically stopping the processing at a current location in the data stream;

automatically loading the plug-in into the filter graph; and automatically restarting the processing at the current location in the data stream, the processing after the restarting including processing the data stream through the plug-in.

14. A processor-readable storage medium as recited in claim 8, wherein the constructing a filter graph comprises:

reading a table of filter characteristics;

identifying a plurality of filters available for operation in a filter graph based on the reading;

creating from the plurality of filters, an instance of a class of filters appropriate for rendering the data stream, each filter in the class of filters operative to conduct a processing operation and having at least one input pin and at least one output pin; and connecting the pins of the filters in the class of filters to assemble the filter graph, the filter graph comprising connected filters wherein the first filter in the filter graph accepts the data stream and the final filter in the filter graph renders the data stream.

15. A processor-readable storage medium as recited in claim 13, wherein the automatically loading the plug-in comprises:

deconstructing the filter graph at a connection point between two filters;

inserting the plug-in at the connection point; and reconstructing the filter graph such that it includes the plug-in inserted between the two filters.

16. A method comprising:

receiving streaming data at a media player;

constructing a filter graph based on a data type of the streaming data received at the media player, wherein the streaming data is in a format know to the media player;

processing the streaming data through the filter graph;

receiving an instruction from a user to load a new filter into the filter graph, wherein the new filter is new to the media player and modifies the streaming data;

registering the new filter with the media player when the new filter is installed, such that the new filter can be recognized by the media player for loading based on registration parameters stored in a registry, and such that the new filter cannot subsequently be pirated for use on other types of media players;

recognizing the new filter based on the registration parameters stored in the registry;

dynamically loading the new filter into the filter graph during the processing of the streaming data through the filter graph in response to the instruction received from the user;

after dynamically loading the new filter into the filter graph, processing the data stream through the filter graph which includes the new filter; and communicating information represented by the data stream to the user via the media player.

17. A method as redted in claim 16, wherein the constructing a filter graph comprises:

reading a registry of filter characteristics;

identifying filters available to process the streaming data based on the filter characteristics;

creating from the filters, an instance of a class of filters appropriate for rendering the streaming data, each filter in the class of filters operative to conduct a processing operation and having at least one input pin and at least one output pin; and connecting the pins of the filters in tie class of filters to assemble the filter graph, the filter graph comprising connected filters wherein the first filter in the filter graph accepts the streaming data and the final filter in the filter graph renders the streaming data.

18. A method as recited in claim 16, wherein the dynamically loading comprises:

stopping the processing at a current location in the streaming data;

deconstructing the filter graph at a connection point between two filters;

inserting the new filter at the connection point;

reconstructing the filter graph such that it includes the new filter inserted between the two filters; and restarting the processing at the current location in the data stream, the processing after the restarting including processing the data stream through the new filter.

19. A method as recited in claim 18, wherein the stopping, the deconstructing, the inserting, the reconstructing and the restarting are performed automatically by a media player.

20. A computer comprising:

one or more processors;

a registration function which executes on the one or more processors to receive a set of registration parameters from a filter plug-in which has been selected by a user for use in processing a data stream, the registration parameters comprising:

a pwszFriendlyName parameter designating a name for the plug-in;

a pwszDescription parameter designating a description of the plug-in;

a pwszUninstallString parameter designating an uninstall string for uninstalling the plug-in;

a dwPriority parameter designating an integer value containing a priority position of the plug-in in a chain of currently enabled plug-ins;

a guidPluginType parameter designating a globally unique identifier that specifies a type for the plug-in;

a Clsid parameter designating a class identifier of the plug-in;

a cMediaType parameter designating a count of media types supported by the plug-in; and a pMediaType parameter designating a pointer to an array of media types that enumerates supported media types for the plug-in.

21. A computer as recited in claim 20, further comprising a registry that includes the set of registration parameters configured on a machine wide basis according to the following format:
- a plug-in type specified by a guidPluginType parameter;
- a plug-in major format specified by a pMediaType parameter that further specifies the plug-in type;
- a plug-in minor format specified by another pMediaType parameter that further specifies the plug-in major format;
- a unique identification of a plug-in specified by a Clsid parameter, the unique identification identifying a plug-in capable of processing the plug-in minor form at;
- a configuration heading for the plug-in type that includes the unique identification of the plug-in specified by the Clsid parameter;
- a description of the plug-in type specified by the pwszDescription parameter;
- a name of the plug-in type specified by the pwszFriendlyName parameter;
- a priority of the plug-in type specified by the dwPriority parameter; and
- an uninstall path specified by the pwszUninstallString parameter.

22. A computer as recited in claim 20, further comprising a registry that includes a subset of the set of registration parameters configured on a per user basis according to the following format:
- a configuration heading for the plug-in type that includes the unique identification of the plug-in specified by the Clsid parameter;
- an enable indicator permitting the user to enable the plug-in; and
- a priority of the plug-in type specified by the dwPriority parameter.

23. A computer as recited in claim 20, further comprising a media player configured to register a filter plug-in according to the registration parameters.

24. A computer as recited in claim 23, further comprising a filter graph manager configured to construct a filter graph based the registration parameters and on a data type of a data stream received by the media player.

25. A computer as recited in claim 24, further comprising a dynamic plug-in loader configured to automatically stop the filter graph from processing the data stream, determine an enabled filter plug-in based on the registration parameters, deconstruct the filter graph, insert the enabled filter plug-in into the filter graph, and restart the processing of the data stream.

26. A computer comprising:
- means for constructing a filter graph to process a data stream from a source file which is received by a media player;
- means for processing the data stream through the filter graph;
- means for receiving an instruction from a user to load a new filter into the filter graph, wherein the new filter is new to the media player and modifies the data of the data stream;
- means for registering the new filter with the media player when the new filter is installed, such that the new filter can be recognized by the media player for loading based on registration parameters stored in a registry, and such that the new filter can not subsequently be pirated for use on other types of media players;
- means for recognizing the new filter based on the registration parameters stored in the registry; and
- means for dynamically loading the new filter into the filter graph during the processing of the data stream through the filter graph in response to the instruction received from the user;
- means for processing the data stream through the filter graph which includes the new filter; and
- means for communicating information represented by the data stream to the user via the media player.

27. A computer as recited in claim 26, wherein the means for constructing a filter graph comprises:
- means for reading a registry of filter characteristics;
- means for identifying a plurality of filters available for operation in a filter graph based on the filter characteristics;
- means for creating from the plurality of filters, an instance of a class of filters appropriate for rendering the data stream, each filter in the class of filters operative to conduct a processing operation and having at least one input pin and at least one output pin; and
- means for connecting the pins of the filters in the class of filters to assemble the filter graph, the filter graph comprising connected filters wherein the first filter in the filter graph accepts the data stream and the final filter in the filter graph renders the data stream.

28. A computer as recited in claim 26, wherein the means for dynamically loading comprises:
- means for automatically stopping the processing at a current location in the data stream;
- means for automatically loading the new filter into the filter graph; and
- means for automatically restarting the processing at the current location in the data stream, the processing after the restarting including processing the data stream through the new filter.

29. A computer as recited in claim 28, wherein the means for automatically loading the new filter comprises:
- means for deconstructing the filter graph at a connection point between two filters;
- means for inserting the new filter at the connection point; and
- means for reconstructing the filter graph such that it includes the new filter inserted between the two filters.

* * * * *